(12) United States Patent
Vallee et al.

(10) Patent No.: US 7,840,496 B2
(45) Date of Patent: Nov. 23, 2010

(54) ELECTRONIC PAYMENT SYSTEM THROUGH A TELECOMMUNICATION NETWORK

(75) Inventors: Francoise Vallee, Lantheuil (FR); Eric Hannecart, Marcq en Broeul (FR); Philippe Michon, Bretteville sur Odon (FR)

(73) Assignee: France Telecom, Paris (FR)

( * ) Notice: Subject to any disclaimer, the term of this patent is extended or adjusted under 35 U.S.C. 154(b) by 1297 days.

(21) Appl. No.: 10/149,235

(22) PCT Filed: Dec. 5, 2000

(86) PCT No.: PCT/FR00/03400

§ 371 (c)(1),
(2), (4) Date: Oct. 28, 2002

(87) PCT Pub. No.: WO01/43087

PCT Pub. Date: Jun. 14, 2001

(65) Prior Publication Data

US 2003/0093385 A1 May 15, 2003

(30) Foreign Application Priority Data

Dec. 9, 1999 (FR) .................................. 99 15644

(51) Int. Cl.
*G06Q 20/00* (2006.01)
*G06K 5/00* (2006.01)
*G06K 19/06* (2006.01)

(52) U.S. Cl. ............................. 705/67; 705/14; 705/40; 705/75; 235/380; 235/492

(58) Field of Classification Search .................... 705/76; 379/114.21, 114
See application file for complete search history.

(56) References Cited

U.S. PATENT DOCUMENTS 5,610,972 A * 3/1997 Emery et al. ................. 455/445
5,754,655 A * 5/1998 Hughes et al. ................ 705/70

(Continued)

FOREIGN PATENT DOCUMENTS

| EP | 0 917 327 | 5/1999 |
| FR | 2 771 205 | 5/1999 |
| FR | 2771205 | 5/1999 |
| FR | 2 779 896 | 12/1999 |
| FR | 2779896 | 12/1999 |
| WO | 98 47116 | 10/1998 |
| WO | 99 23617 | 5/1999 |

*Primary Examiner*—Charles C Agwumezie
(74) *Attorney, Agent, or Firm*—David D. Brush; Westman, Champlin & Kelly, P.A.

(57) ABSTRACT

An electronic system for payment via a telecommunications network between firstly a vendor having a server suitable for implementing a secure protocol for payment by smart card, and secondly a client having navigation and electronic payment means suitable for making a payment to said vendor using client software for handling payment that includes the secure payment protocol. The client software for handling payment is installed on a payment server on the telecommunications network. The system comprises, at the client end, navigation means, electronic payment means constituted by a mobile terminal connected to the network and including a reader for reading payment smart cards, and means for redirecting messages suitable for transmitting at least the call number of the mobile terminal to the payment server.

16 Claims, 3 Drawing Sheets

U.S. PATENT DOCUMENTS

| | | | | | |
|---|---|---|---|---|---|
| 5,778,173 | A | * | 7/1998 | Apte | 726/2 |
| 6,123,259 | A | * | 9/2000 | Ogasawara | 235/380 |
| 6,250,557 | B1 | * | 6/2001 | Forslund et al. | 235/492 |
| 6,976,011 | B1 | * | 12/2005 | Capitant et al. | 705/67 |
| 2001/0005840 | A1 | * | 6/2001 | Verkama | 705/67 |
| 2002/0123965 | A1 | * | 9/2002 | Phillips | 705/41 |
| 2002/0194121 | A1 | * | 12/2002 | Takayama | 705/39 |
| 2003/0200179 | A1 | * | 10/2003 | Kwan | 705/65 |
| 2005/0086164 | A1 | * | 4/2005 | Kim et al. | 705/40 |
| 2005/0171847 | A1 | * | 8/2005 | Ling | 705/14 |

* cited by examiner

ELECTRONIC PAYMENT SYSTEM THROUGH A TELECOMMUNICATION NETWORK

This application is a U.S. National Phase Application under 35 USC 371 of International Application PCT/FR00/03400 (not published in English) filed 5 Dec. 2000.

BACKGROUND OF THE INVENTION

1. Field of the Invention

The present invention relates to a system for electronic payment via a telecommunications network. It also relates to a payment server and to means for redirecting messages by said electronic payment system.

A particularly advantageous application of the invention lies in the field of electronic commerce.

2. Description of Related Art

The development of telecommunications via the worldwide Web (the "Web") and the Internet has had the consequence of promoting electronic commerce on a vast scale. In general, a transaction in electronic commerce takes place by means of an electronic payment system via the telecommunications network, in this case the Web, between a vendor having a server connected to said network and a client having navigation and electronic payment means suitable for establishing a connection over the network with the vendor's server and for making a payment to said vendor. As a general rule, the navigation and electronic payment means are constituted by a computer, e.g. a PC type microcomputer, used as means for navigating the network, and by a reader of payment smart cards connected to said computer and performing the electronic payment function.

Naturally, transactions performed over the telecommunications network must be made highly secure so as to avoid any interception of messages exchanged between the vendor, the client, and the remote payment administrator, and to proceed with all of the verifications of authentication that are necessary. Thus, various secure payment protocols have been proposed, such as the "Secure Electronic Transaction" (SET) protocol. In this context, the vendor's server is configured to be capable of implementing the selected secure payment protocol. Similarly, at the client end, said secure payment protocol is included in client software for handling payment installed on the client's computer, and which, in addition to ensuring that transactions are secure, is capable of performing other operations, such as handling audit trails, and it possesses an interface with the smart card reader in order to take account of the extension to the SET protocol which makes it possible to use such smart cards.

Nevertheless, the presently known electronic payment systems as described above present a certain number of drawbacks. Installing a large piece of software such as the client software for handling payment on the client's computer gives rise to problems with downloading, with updating, and with the amount of memory occupied and the amount of hard disk occupied. Furthermore, the system is fully installed on a fixed station, i.e. the computer, and that can impede client mobility.

SUMMARY OF THE INVENTION

Thus, the technical problem to be solved by the subject matter of the present invention is to propose a system for performing electronic payment via a telecommunications network between firstly a vendor having a server connected to said network and suitable for implementing a protocol for secure payment by smart cards, a secondly a client having navigation and electronic payment means suitable for establishing a connection over the network with the vendor's server and for making a payment with said vendor using client software for handling payment that includes said secure payment protocol, which electronic payment system makes it possible simultaneously for the client to have a degree of mobility relative to the fixed computer, for the configuration of the computer to be simplified, and for memory requirements to be reduced.

According to the present invention, the solution to the technical problem posed consists in that said client software for handling payment is installed on a payment server on the telecommunications network, and said system comprises, at the client end:

navigation means,
    electronic payment means constituted by a mobile terminal connected to said network and including a reader for reading payment smart cards; and
    means for redirecting messages suitable for transmitting at least the call number of said mobile terminal to said payment server.

It will thus be understood that relocating the client software for handling payment through the payment server makes the system of the invention considerably less cumbersome at the client end. In particular, there is no need for the client to download said client software or to store it in memory or to update it, since all that is done directly on the payment server. In addition, using a mobile terminal as payment means gives the client greater freedom of movement than when using a fixed computer fitted with a smart card reader.

In a first embodiment of the electronic payment system of the invention, said navigation means is constituted by a computer, the redirection means being communications software installed on said computer. Under such circumstances, the mobile terminal is dedicated solely to electronic payment.

Two variants of this first embodiment can be envisaged. A first variant provides for said redirection means to be suitable also for transmitting the call number of the vendor's server to the payment server, with payment being handled between the payment server and the mobile terminal and the vendor's server. In a second variant, said redirection means is suitable for redirecting messages between the payment server and the vendor's server, payment being handled between the payment server and the mobile terminal and the vendor's server via the redirection means.

In two other embodiments of the invention, said navigation means is constituted by the mobile terminal, said redirection means being communications software installed in a gateway of said telecommunications network or on the mobile terminal. In both cases, the mobile terminal serves both for electronic payment and for navigation.

Finally, the mobile terminal may be either a GSM type mobile telephone or else a Personal Digital Assistant (PDA).

The invention also provides a payment server for a system for electronic payment via a telecommunications network between firstly a vendor having a server connected to said network and suitable for implementing a secure protocol for payment by smart card, and secondly a client having navigation and electronic payment means suitable for setting up a connection over the network with the vendor's server and for making a payment to said vendor using client software for handling payment that includes said secure payment protocol, said payment server being remarkable in particular in that it is connected to said telecommunications network and contains said client software for secure payment handling.

The invention also provides a message redirection means for a system for electronic payment via a telecommunications network between firstly a vendor having a server connected to said network and suitable for implementing a secure protocol for payment by smart cards, and secondly a client having navigation and electronic payment means suitable for establishing a connection over the network with the vendor's server and for making a payment to said vendor using client software for handling payment that includes said secure payment protocol, said message redirection means being remarkable in particular in that it is suitable for transmitting at least the call number of a payment mobile terminal connected to said network and including a reader for reading payment smart cards to a payment server connected to said network and containing said client software for secure payment handling.

BRIEF DESCRIPTION OF THE DRAWINGS

The following description with reference to the accompanying drawings, given as non-limiting examples, shows clearly what the invention consists in and how it can be implemented.

DETAILED DESCRIPTION OF THE DRAWINGS

Figure 1:
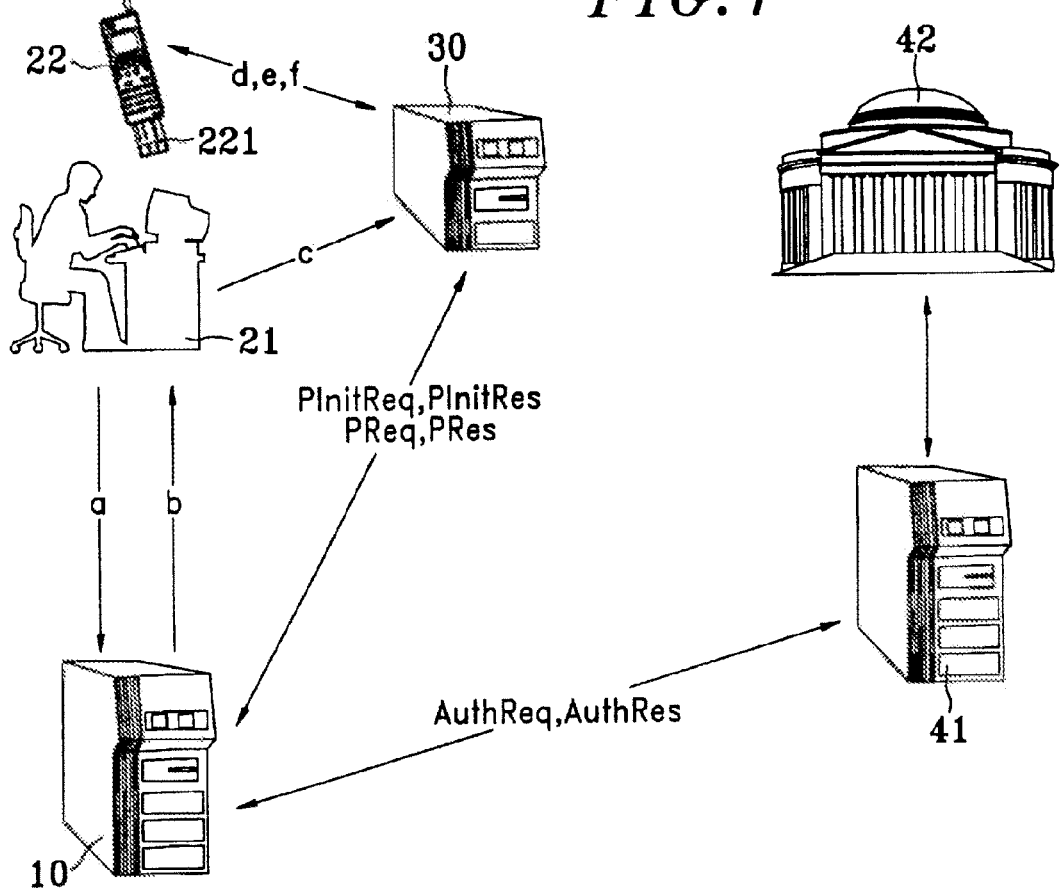
FIG. 1 is a diagram of a first embodiment of the electronic payment system of the invention.

FIG. 1 is a diagram showing a system for electronic payment via a telecommunications network, e.g. the Internet over the Web. In this system, a vendor has a server 10 connected to the network and suitable for implementing a secure protocol for payment by smart cards. This protocol can be the Secure Electronic Transaction (SET) protocol developed by bank card operators, and its specifications are public and available at the Internet address www.setco.org. An extension of the protocol to smart cards has been developed by Cybercom. The client has navigation and electronic payment means which, in the example of FIG. 1, are constituted firstly by a computer 21 suitable for setting up a connection over the network with the vendor's server 10 and essentially used for navigating the Web, consulting the vendor's site, and for making orders, and secondly a mobile terminal 22 connected to the network and including a reader for reading a payment smart card 221. In the embodiment shown in FIG. 1, said mobile terminal 22 is a GSM type mobile telephone, however it could equally well be a Personal Digital Assistant (PDA) provided with a smart card reader.

In order to carry out secure transactions with the vendor, the client has client software for handling payment and including, amongst other things, the SET protocol together with its extension to smart cards. This client software is also capable of performing other operations, such as handling data relating to the client such as audit trails, payment ceilings, and loyalty points. In the embodiment shown in FIG. 1, said client software for handling payment is installed on a payment server 30 on the network, instead of on the client's computer 21, thereby considerably simplifying configuration and operation. Nevertheless, the computer 21 does have communications software serving as means for redirecting messages to the payment server 30, in particular for informing said server 30 of the call number of the mobile terminal 22 and the call number of the vendor's server 10.

Figure 2:
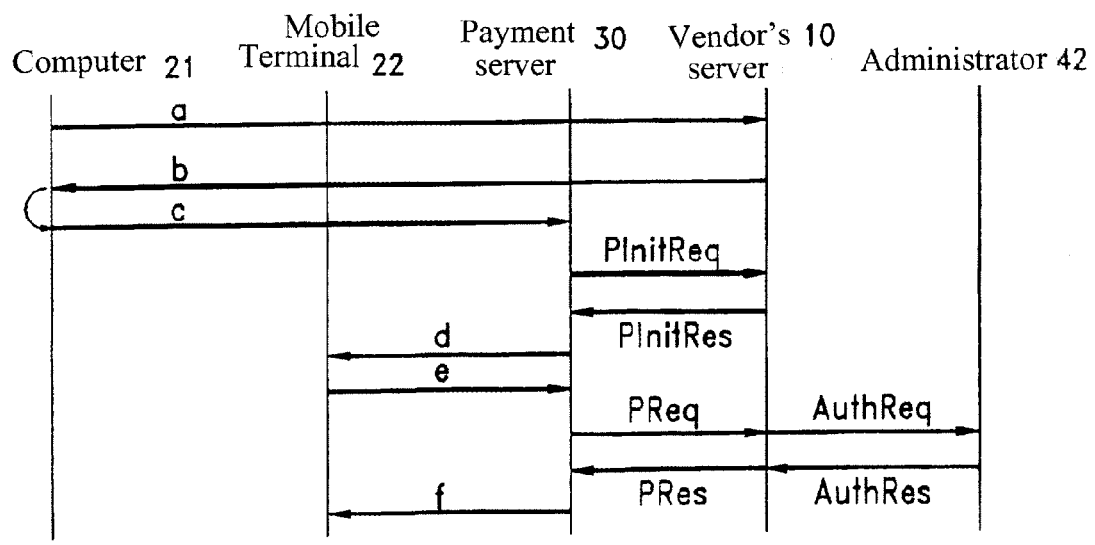
FIG. 2 is an information exchange diagram relating to the FIG. 1 embodiment.

Thus, as explained in greater detail below with reference to FIG. 2, the electronic transaction between the vendor and the client takes place as follows. After an initial stage of communication between the vendor's server 10 and the client's computer 21, the payment server 30 receives the number for calling the mobile terminal 22 from the client via the computer 21, possibly also together with authentication data and the number for calling the vendor's server 10. From this moment, information concerning the transaction is exchanged solely between the vendor's server 10, the payment server 30 which then represents the client, and the client's mobile terminal 22, while the computer 21 is no longer involved in the exchange of information. More precisely, communication between the vendor's server 10 and the payment server 30 is governed by the secure SET protocol, as are transaction-setting calls between the vendor's server 10 and the payment acquisition interface 41 leading to the remote payment administrator 42. However, exchanges between the server 30 and the mobile terminal 22 take place without the secure SET protocol, which is of little consequence since the risk of interception at this level is relatively low.

An example of information exchange within the electronic payment system of FIG. 1 is described more particularly below with reference to FIG. 2.

After using the navigation computer 21 to select a purchase, the client sends a payment order message a to the vendor's server 10. The server 10 responds with a wakeup message b accompanied by the call number of the server 10. This message b is redirected by the redirection means of the computer 21 to the payment server 30, with the resulting redirected message c also containing the call number of the mobile terminal 22. At this moment, the payment server 30 knows all of the call numbers it needs in order to handle the transaction, i.e. the number of the vendor's server 10 and the number of the mobile terminal 21. It can also be observed that the redirected message c may optionally also contain data authenticating the client.

Thereafter, the payment server 30 exchanges with the vendor's server 10 the PInitReq and PInitRes messages specified in the SET protocol; this relates essentially to requesting a certificate specific to the vendor and sending said certificate to the server 30. Thereafter, the payment server 30 calls the mobile terminal 22, sending in a message d requesting in particular the number of the payment smart card 221 and the client's signature. This information is supplied by the mobile terminal 22 in a response message e. The messages d and e are exchanged using various available protocols, such as the following: Short Message Service (SMS), Wireless Application Protocol (WAP), or indeed the Hypertext Transfer Protocol (HTTP).

The transaction then continues using the extended SET protocol: the server 30 prepares a message comprising, amongst other things, the number of the card 221, the client's signature, the price of the purchase, the identity of the purchased goods, and the identity of the vendor. Some of this information is transmitted to the vendor's server 10 in the form of a PReq message, and in particular the purchase price and the identity of the purchased goods, and some of this information such as the card number and the client's signature is sent in an AuthReq message via the server 10 to the interface 41 and the administrator 42. The administrator verifies the client's signature and checks that it has not been stopped. When verification is positive, the operator sends an authorization message AuthRes which is relayed to the server 30 via the vendor's server 10 in a PRes message and then to the client's terminal 22 in a message f confirming the transaction.

The second embodiment of the invention shown in FIG. 3 differs from that described with reference to FIGS. 1 and 2 in that the exchanges of information between the payment server and the vendor's server 10 no longer take place directly but via the redirection means of the computer 21. In this case, there is no longer any need for the call number of the vendor's server 10 to be communicated to the payment server 30 by the redirection means.

Figure 3:
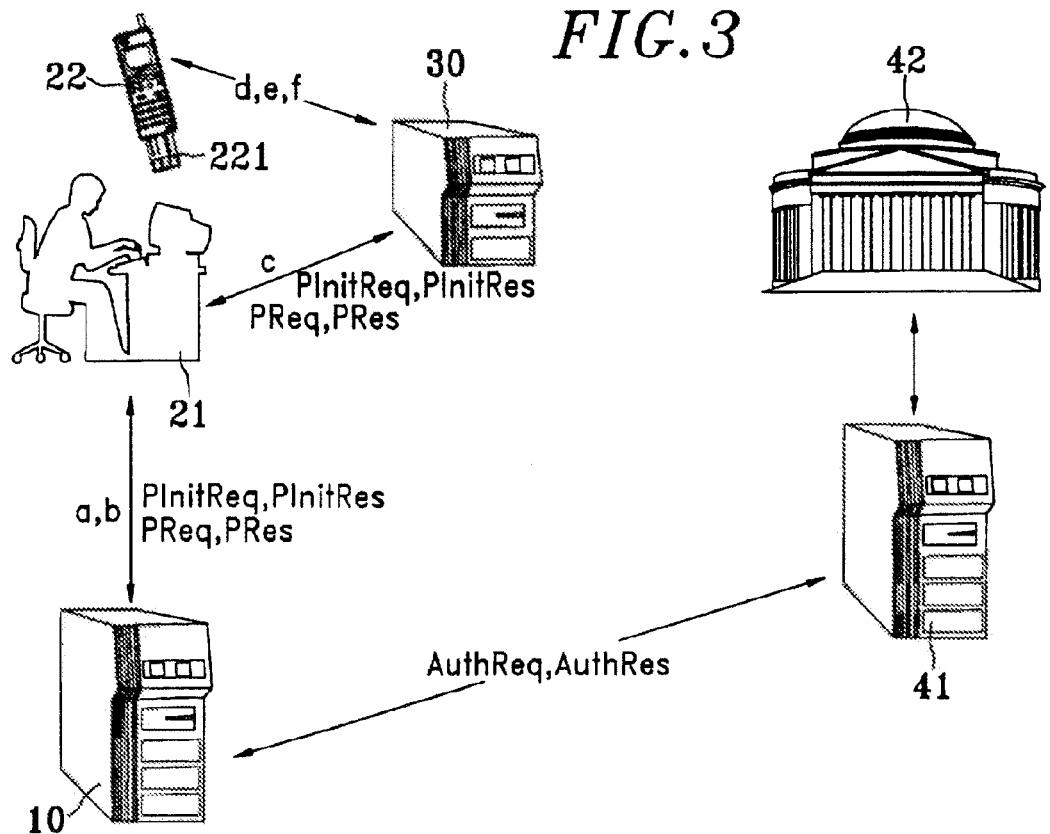
FIG. 3 is a diagram of a second embodiment of the electronic payment system of the invention.
Figure 4:
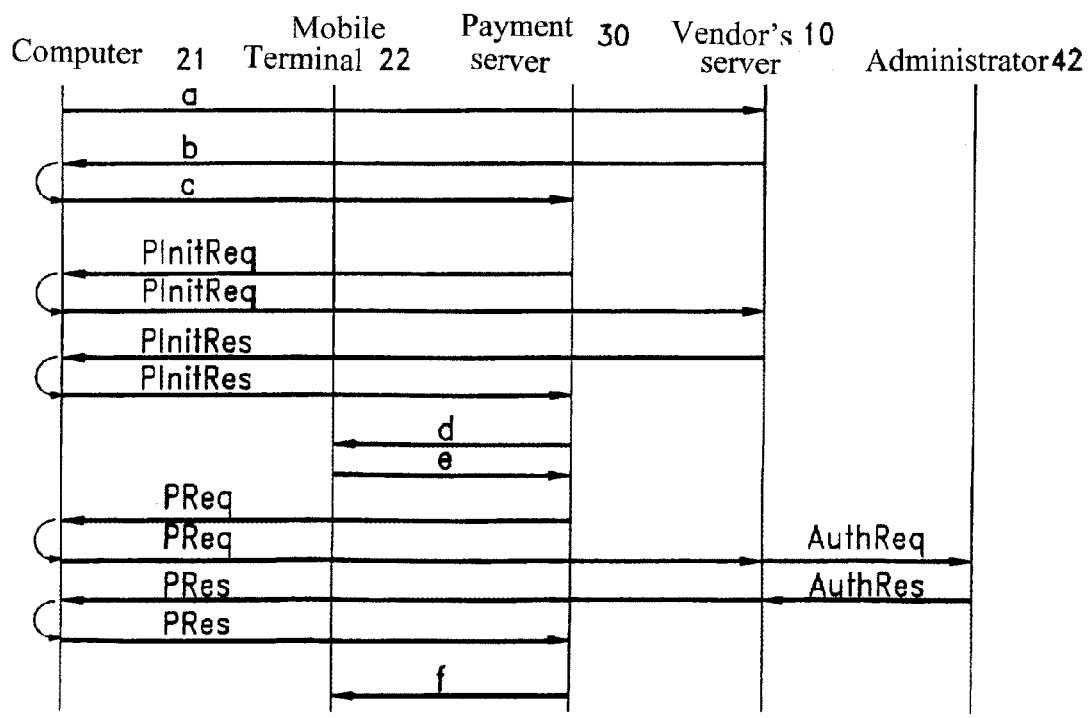
FIG. 4 is an information exchange diagram relating to the FIG. 3 embodiment.

FIG. 4 is an information exchange diagram corresponding to the embodiment of FIG. 3. Compared with the diagram of FIG. 2, it can be observed that messages from the payment server 30 to the vendor's server 10 are redirected by the client's computer 22, and vice versa.

Figure 5:
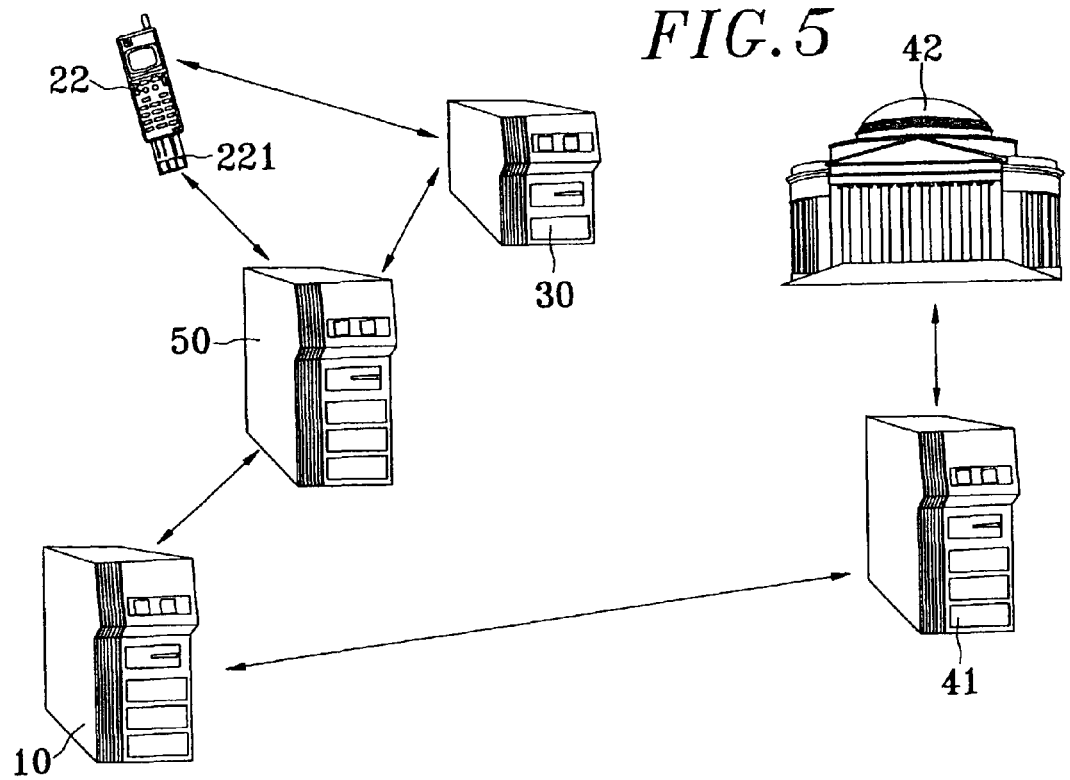
FIG. 5 is a diagram of a third embodiment of the electronic payment system of the invention.
Figure 6:
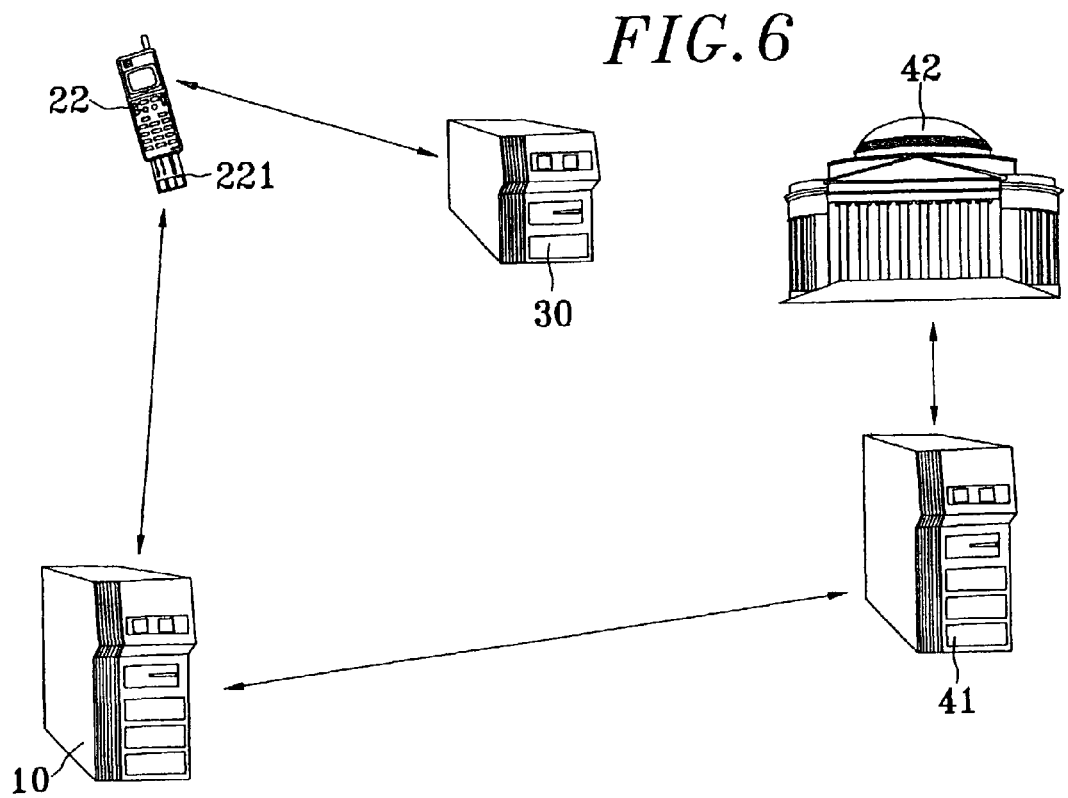
FIG. 6 is a diagram of a fourth embodiment of the electronic payment system of the invention.

FIGS. 5 and 6 show two other embodiments in which the navigation means is also constituted by the mobile terminal 22, with this being possible by implementing the WAP protocol. Under such circumstances, the redirection means can be installed in a communications gateway 50 (in a "Proxy") between the mobile terminal 22 and the telecommunications network, in this case the Web, as shown in FIG. 5. If the capacity of the mobile terminal 22 is sufficient, the redirection means can be installed on the terminal 22 itself, as shown in FIG. 6. The information exchange diagrams are identical to those of FIGS. 2 and 4.

The invention claimed is:

1. A system for electronic payment via a telecommunications network, the system comprising:
   a vendor server connected to said telecommunications network and configured to implement a secure protocol for payment by smart card;
   a payment server connected to said telecommunications network;
   a mobile terminal comprising a call number and electronic payment means including a reader for reading a payment smart card and for obtaining a card number of the payment smart card; and
   a computer comprising:
      navigation means for establishing a connection with and sending a payment order message to the vendor server over the telecommunications network based on a selected purchase, and
      message redirection means for redirecting messages between the vendor server and the payment server, wherein redirecting comprises receiving a wakeup message from the vendor server, inserting the call number of the mobile terminal into the wakeup message, and redirecting the wakeup message from the computer to the payment server on the telecommunications network;
   wherein said payment server includes client software configured for handling payment and includes said secure protocol for payment; and
   wherein said payment server comprises means for retrieving the call number from the wakeup message, means for calling the mobile terminal using the retrieved call number, means for requesting and obtaining a card number from said electronic payment means and means for handling the payment using said card number and said client software.

2. The system according to claim 1, wherein the message redirection means comprise communications software installed on said computer.

3. The system according to claim 1, wherein said message redirection means comprise means for transmitting a call number of the vendor server to the payment server, the payment being handled between the payment server and the mobile terminal and the vendor server.

4. The system according to claim 1, wherein said message redirection means comprise means for redirecting messages between the payment server and the vendor server, the payment being handled between the payment server and the mobile terminal and the vendor server via the redirection means.

5. The system according to claim 1, wherein said mobile terminal is a mobile telephone of the GSM type.

6. The system according to claim 1, wherein said mobile terminal is a Personal Digital Assistant.

7. The system according to claim 1, wherein said message redirection means comprise means for transmitting client authentication data to the payment server.

8. A method for electronic payment via a telecommunications network between firstly a vendor having a server connected to said telecommunications network and being configured to implement a secure electronic transaction (SET) protocol for payment by smart card, and secondly a client having a computer and a mobile terminal with a call number, the method comprising the steps of:
   (a) sending a payment order message from the computer of the client to the vendor server based on a selected purchase by the client;
   (b) sending a wakeup message from the vendor server to the computer of the client;
   (c) inserting the call number of the mobile terminal into the wakeup message and redirecting the wakeup message from the computer of the client to a payment server, wherein the payment server comprises client software for handling payment;
   (d) retrieving the call number from the wakeup message;
   (e) sending a request message from the payment server to the mobile terminal, using said call number, to obtain a number of a smart card;
   (f) supplying the number of the smart card from the mobile terminal to the payment server in a response message; and
   (g) processing the payment order by the payment server using said card number of the smart card and the client software for handling payment which is installed on the payment server.

9. The method according to claim 8, wherein the redirected wakeup message contains data for authenticating the client.

10. The method according to claim 8, wherein said request message and response message are exchanged using a predetermined protocol.

11. The method according to claim 8, wherein the step of processing the payment comprises preparing a message comprising at least one of the number of the smart card, a signature of the client, a selected purchase price, an identity of purchased goods and an identity of the vendor, and transmitting the message to the vendor server.

12. The method according to claim 8, further comprising the step of:
   receiving an authorisation message from the payment server via the vendor server in a positive response message; and sending the authorisation message in a confirmation message to the mobile terminal if a client signature in the response message is positively verified.

13. The method according to claim 8, wherein said response message contains a signature of the client.

14. The method according to claim 10, wherein said predetermined protocol comprises one of short message service (SMS), wireless application protocol (WAP), and Hypertext Transfer Protocol (HTTP).

15. The method according to claim 11, wherein the number of the smart card is sent in an authorization request message via the vendor server to an interface and an administrator.

16. The method according to claim 15, wherein the purchase price and the identity of the purchased goods are transmitted to the vendor server in an authorization response message.

* * * * *